United States Patent [19]

Cheng et al.

[11] Patent Number: 4,948,212
[45] Date of Patent: Aug. 14, 1990

[54] OPTICAL PROCESSING IN III-V AND II-VI COMPOUND SEMICONDUCTORS

[75] Inventors: Li-Jen Cheng, La Crescenta; Gregory O. Gheen, Pasadena, both of Calif.

[73] Assignee: California Institute of Technology, Pasadena, Calif.

[21] Appl. No.: 234,519

[22] Filed: Aug. 22, 1988

[51] Int. Cl.$^5$ .......................... G02F 1/29; G03H 1/22
[52] U.S. Cl. .................................. 350/3.64; 350/370; 350/374
[58] Field of Search ...................... 350/3.64, 370, 374

[56] References Cited

U.S. PATENT DOCUMENTS

| | | | |
|---|---|---|---|
| 4,429,954 | 2/1984 | Caulfield et al. | 350/3.64 |
| 4,674,824 | 6/1987 | Goodman et al. | 350/3.64 |
| 4,761,059 | 8/1988 | Yeh et al. | 350/3.64 |
| 4,807,970 | 2/1989 | Dube et al. | 350/3.64 |

OTHER PUBLICATIONS

Borshch et al., "New Mechanism for High-Speed Recording and Erasure of Dynamic Holograms"; *Sov. Tech. Phys. Letters*, vol. 5, No. 2; Feb. 1979; pp. 94–95.

*Primary Examiner*—Bruce Y. Arnold
*Assistant Examiner*—Terry S. Callaghan
*Attorney, Agent, or Firm*—David W. Collins

[57] ABSTRACT

Optical processing using photorefractive GaAs and other compound semiconductor crystals (28) is achieved in a four-wave mixing configuration. Potential applications of optical processing include spatial light modulation, phase conjugation, correlation, convolution, edge enhancement, matrix multiplication, incoherent-to-coherent conversion, and many others. In particular embodiments, optical processing, matrix multiplication, and integrated semiconductor optical information processors are demonstrated. In the case of integration of semiconductors and optical information processors, a spatial light modulator (88) is fabricated on a surface of a compound semiconductor crystal to form an integrated device (86). The device uses the spatial light modulator to transfer electrical data into an optical form and then employs the photorefractive effect in the bulk for processing the data.

44 Claims, 6 Drawing Sheets

OPTICAL PROCESSING IN III-V AND II-VI COMPOUND SEMICONDUCTORS

ORIGIN OF INVENTION

The invention described herein was made in the performance of work under a NASA contract, and is subject to the provisions of Public Law 96-517 (35 U.S.C. 202) in which the Contractor has elected to retain title.

CROSS-REFERENCE TO RELATED APPLICATION

This application is related to Ser. No. 07/172,007, filed March 23, 1988, now U.S. Pat. No. 4,898,436, which discloses spatial light modulation in photorefractive GaAs using a cross polarization beam coupling process. That application concerns the use of GaAs as an optical processing medium for two-wave mixing. The present application is directed to the use of GaAs as an optical processing medium for four-wave mixing.

TECHNICAL FIELD

The present invention relates to optical processing such as achieved with four-wave mixing, and, more particularly, to optical processing using III-V and II-VI compound semiconductor materials.

BACKGROUND ART

The photorefractive effect is an interesting physical phenomenon with substantial technological importance. Its potential for optical processing and optical computing applications has been demonstrated in crystals, such as bismuth silicon oxide ($Bi_{12}SiO_{20}$), barium titanate ($BaTiO_3$), lithium niobate ($LiNbO_3$) and strontium barium niobate ($Sr_{0.6}Ba_{0.4}Nb_2O_6$).

However, these oxide materials have two major weak points towards actual applications. These weaknesses include: (1) their photorefractive response is too slow, and (2) their operation wavelength is in the range of 0.4 to 0.7 $\mu$m, requiring gas lasers which are expensive, fragile, and large in size. These weaknesses limit the applications of these materials. For example, these oxide materials are not desirable for applications requiring high-speed, real-time operation with low-power consumption in a compact system.

Matrix-vector multiplication is a basic operation in matrix algebra with a variety of applications, especially in signal and image processing, optical interconnects, and neural networks. Because of the high degree of parallelism in optics, optical techniques can offer a great advantage in speed by performing operations concurrently. A considerable amount of work has been reported on performing matrix-vector multiplication using conventional optical means. Recently, Yeh and Chiou described a method of using four-wave mixing in nonlinear media to perform matrix-vector multiplication; see, *Opt. Lett.*, Vol. 12, pp. 138–140 (1987); Technical Digest of the 1986 Annual Meeting of the Optical Society of America, Seattle, WA. The authors demonstrated the concept using a photorefractive $BaTiO_3$ crystal. The possibility of performing the summation in a four-wave mixing process was pointed out by Yeh and Chiou.

However, the aforementioned weaknesses limit the use of photorefractive oxides, such as $BaTiO_3$, in matrix multiplication. In addition, these oxides cannot be integrated together with the existing electronic and optoelectronic technologies.

Optical information systems are built with conventional discrete active processors and passive components. These systems are physically large, limiting applications. Currently, integrated optics concerns mainly the integration of optoelectronics and electronics using the planar technology. This also restricts the utilization of the full potential of optics.

It is desired to provide optical processing in materials that enjoy compatibility with existing electronic and optoelectronic systems. Such materials should be faster than the photorefractive oxides and be capable of operating in regions accessible to semiconductor lasers.

DISCLOSURE OF INVENTION

In accordance with the invention, III-V and II-VI compound semiconductors, having space group 43m, are potential photorefractive materials for real-time optical processors offering high speed, low-power consumption and compact size. Examples of suitable materials include GaAs, InP, and CdTe.

The photorefractive response time in GaAs is in tens of microseconds, about two orders of magnitude faster than those of the afore-mentioned oxides. The sensitivity of GaAs for writing a grating is about 5 microjoules/$cm^2$, which corresponds to the maximum predicted sensitivity obtainable with the photorefractive effect. The GaAs devices operate in the infrared wavelength range of 0.9 to 1.6 $\mu$m, which is compatible with semiconductor injection lasers and miniaturized diode-pumped YAG lasers. The devices have tunable information storage time varying from sub-milliseconds to seconds, which provides a versatility for device design and operation.

High quality and large-size crystals are available, because of the advancement of the GaAs material technology. In addition, the GaAs devices are compatible with GaAs electronic circuitry and optoelectronics which could lead to development of a new generation of intelligent and sophisticated devices by integrating together electronics, optoelectronics, and electro-optics technologies.

Also in accordance with the invention, the demonstration of several aspects of optical information processing using photorefractive GaAs in the four-wave mixing configuration is provided. Such optical information processing includes imaging by phase conjugation, image edge enhancement, image convolution and correlation, and matrix-vector multiplication.

Further in accordance with the invention, a novel configuration is provided, using a thin photorefractive crystalline wafer for optical matrix-vector multiplication which is different from the bulk crystal disclosed in the prior art. For example, a piece of rectangular shape wafer cleaved from a GaAs wafer commonly used for high-speed electronics is suitably employed in the practice of the invention. Such wafers permit developing compact information processing systems by integrating electronics, optoelectronics, and electro-optics together to form a new technology with combined advantages of the three.

Integration of optical processors with optoelectronic and electronic devices using semiconductor technologies is also provided in accordance with the invention. The integration uses a three dimensional integration, which takes all advantages of electronics and optics. This could lead to the miniaturization of optical systems, important to the future development of sophisticated information systems.

BRIEF DESCRIPTION OF THE DRAWINGS

FIG. 4b is a schematic diagram similar to that of FIG. 2, except using the integrated spatial light modulator and processor of FIG. 4a;

BEST MODES FOR CARRYING OUT THE INVENTION

The present invention uses four-wave mixing configurations to perform various optical processing functions. There are a number of potential applications for optical processing using photorefractive GaAs in the four-wave mixing configuration. Among them, five applications have recently been demonstrated by the inventors and are discussed below.

A. OPTICAL PROCESSING

This section discusses four demonstrations, namely, imaging by phase conjugation, image edge enhancement, image convolution, and image correlation.

The crystal structure of GaAs is cubic, with 43m symmetry. Its optical property is isotropic, namely no birefringence. According to the electro-optic tensor of GaAs, when an electric field is applied along one of its cubic axes, the index of refraction in altered in the plane perpendicular to that cubic axis. In that plane, the two principal axes of the index ellipsoid bisect the other two cubic axes.

Figure 1:
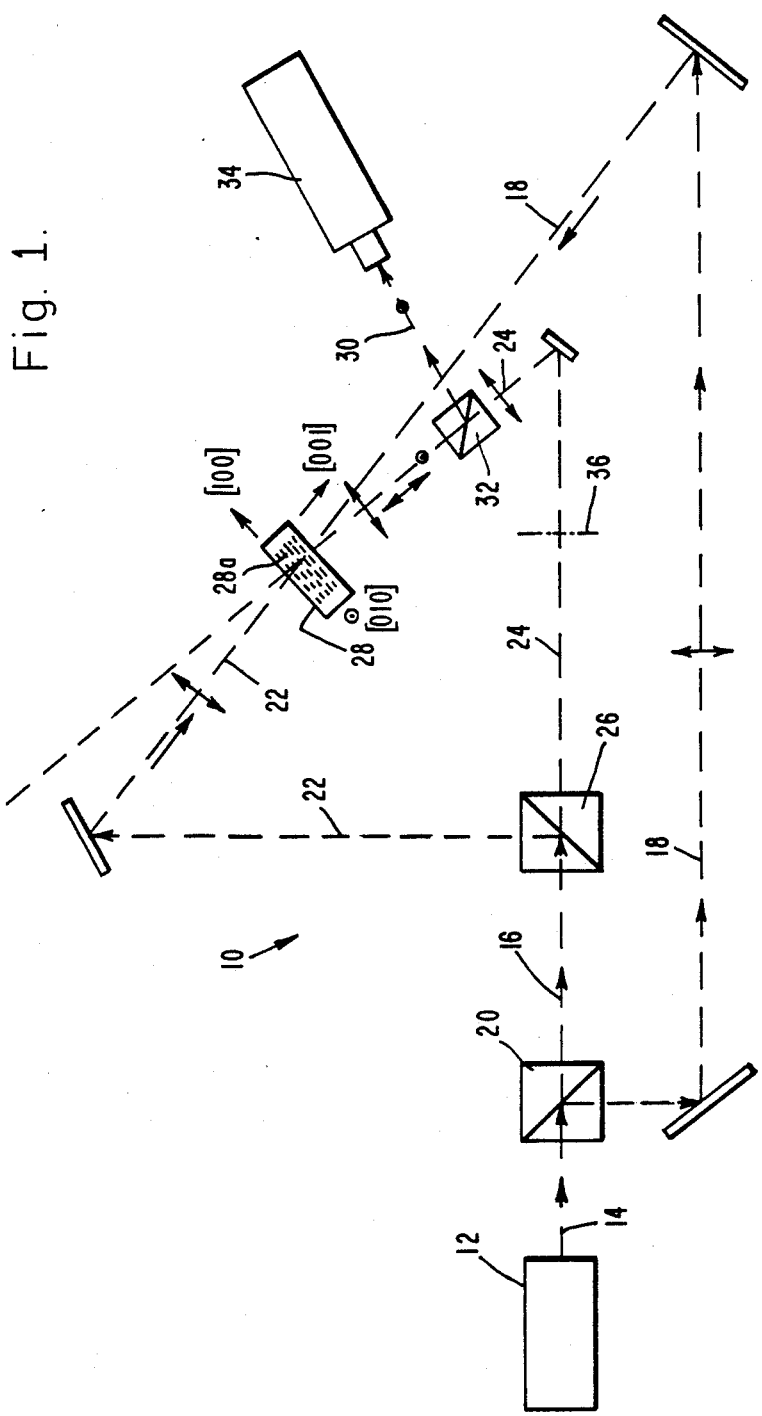
FIG. 1 is a schematic view of an experimental setup for phase conjugate four-wave mixing, depicting imaging by phase conjugation.

For example, a crystal cut from a [001]-oriented, LEC-grown, semi-insulating GaAs wafer with a thickness of 5 mm was used. The sample surface was about 9 mm × 9 mm. This crystal can be used in two different orientations. FIG. 1 illustrates the experimental setup 10 of demonstrating the four applications with one crystal orientation. The use of the second orientation will be discussed below.

A 1.06 μm Nd:YAG laser 12 is used to generate a beam 14 which is split into two beams, beam 16 and reading beam 18, by a beam splitter 20 (the small arrows along the beam path indicate the direction of polarization of the beam). Beam 16 is further split into writing beams 22 and 24 by a beam splitter 26.

Writing beams 22 and 24, with polarization parallel to the plane of the drawing, illuminate a GaAs crystal 28 from opposite sides in such a way that the space charge field and the grating vector induced via the photorefractive effect are perpendicular to the sample surface, namely along [001]. According to the electro-optic properties of GaAs, the grating will rotate the polarization of the diffracted light by 90° if the incoming light is polarized along the [100]or [010]direction. Since the reading beam 18 is polarized along [100], the resulting phase conjugate beam 30 is polarized along [010]perpendicular to those of the other three beams 18, 22, 24. Thus, beam 30 can easily be separated using a polarizing beam splitter 32 and deflected to a camera 34, where it is detected.

The polarizer 32 will also reduce the noise caused by randomly scattered background light. A transparency 36 is placed at a given distance d from the crystal to encode beam 24 with spatial information. As used herein, "transparency" refers to a device capable of encoding incoming optical beams. Such devices, for example, can comprise developed photographic films and electrically and optically addressed spatial light modulators.

Because of the phase conjugate nature of beam 30, an image of the input transparency 36 is formed at the same distance from the crystal. This process is actually an imaging by phase conjugation.

Figure 5C:
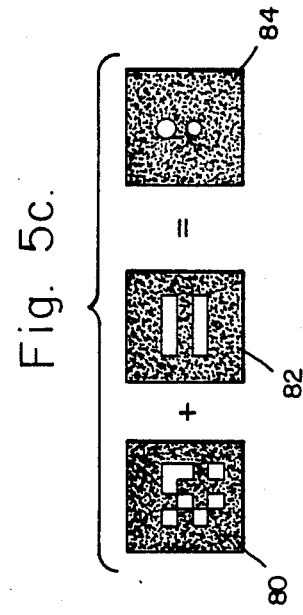
FIG. 5c depicts the results obtained by matrix-vector multiplication, again using line drawings to represent actual results obtained with photographic film.
Figure 5A:
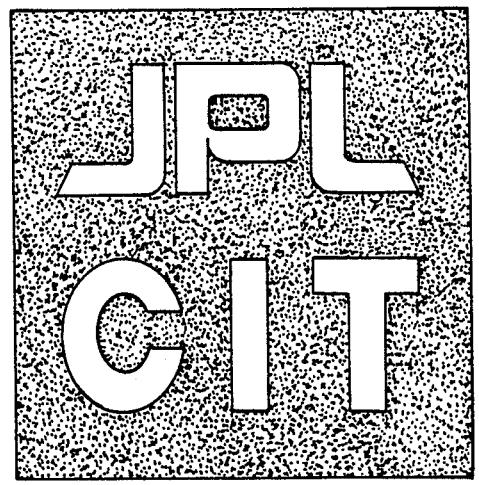
FIGS. 5a and 5b depict the results obtained by phase conjugation using the apparatus of FIG. 1 and by image edge enhancement using the apparatus of FIG. 1a, respectively, employing line drawings to represent actual results obtained with photographic film.

The resulting image is shown in FIG. 5a, represented by a line drawing, where the stippled regions depict unexposed film. The original transparency 36 employed transparent letters on an opaque background.

Figure 1A:
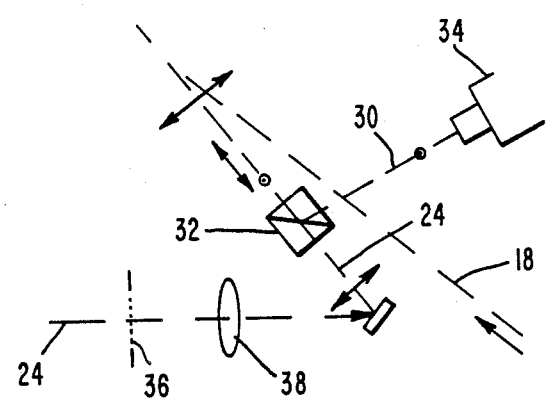
FIGS. 1a and 1b are similar views, but depicting image edge enhancement and image correlation and convolution, respectively.

The second optical process demonstrated is image edge enhancement. FIG. 1a depicts the changes necessary in the experimental set-up of FIG. 1 to effect this process. For this, a lens 38 is placed before the transparency 36 in beam 24 with the Fourier plane of the lens coinciding with the crystal 28. The light distribution falling on the crystal from the beam 24 is proportional to the Fourier transform of the transparency 36. The beam ratio between the two writing beams 22, 24 is adjusted so that they are approximately equal for the light representing the high frequency information. Under this condition, the DC and low frequency components of the transparency's spectrum, which are much brighter than those of the higher spatial frequencies, will form a grating with weak modulation. Therefore, the hologram (i.e., grating 28a in the crystal 28) acts as a high pass filter of the spatial frequency information. This provides the edge enhancement.

Figure 5B:
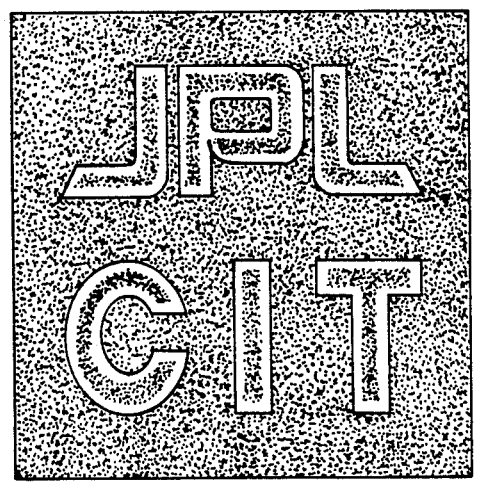

The resulting image is shown in FIG. 5b, represented by a line drawing, where the stippled regions depict unexposed film. The original transparency 36 employed transparent letters on an opaque background.

Figure 1B:
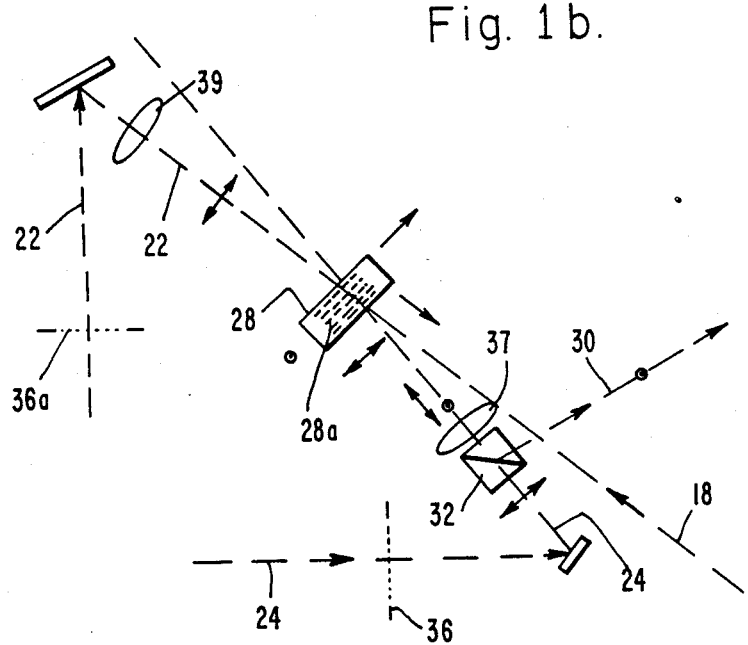

The third optical process demonstrated is image correlation and convolution. FIG. 1b depicts the changes necessary in the experimental set-up of FIG. 1 to effect this process. Two different transparencies 36 and 36a and two lenses 37 and 39 are placed in each of the writing beams 22 and 24. The transparency-lens combination in each beam is arranged so that the crystal 28 is illuminated with the Fourier transform of the input transparencies. The resulting grating structure 28a is read out by beam 18 to produce beam 30. Beam 30 is then Fourier transformed by passing it through lens 37. The image obtained is the convolution of the patterns in the two transparencies. If one of the transparencies is reflected around its center, namely, the pattern in the transparency is transferred through a reflection process, the process of the invention performs an image correlation.

If there is a match between elements in the two transparencies, a signal is obtained from the detector 34. If there is no such match, then only noise is detected.

For the second crystal orientation, the crystal was rotated 90° about the [001]axis and beam 18 was polarized along the direction perpendicular to the plane of the paper, namely, along the [110]crystal direction. According to the electro-optic properties of GaAs, beam 30 will have the same polarization of beam 18. Using the same experimental setup, the same results were obtained for the imaging by phase conjugation. It is expected that the optical processing capability of the second crystal orientation is similar to the first crystal orientation. (Crystal orientation in this context refers to the orientation of the crystal 28 with respect to the write beam geometry.)

Similar results are expected using crystals of different orientations, such as the one disclosed previously in the above-referenced Ser. No. 07/172,007, now U.S. Pat. No. 4,898,436. For use of this crystal orientation, the propagation of the writing beam has to be co-directional.

In addition to the above-stated optical processing applications of the four-wave mixing in GaAs, there are a number of other potential applications, including vector-matrix multiplication (described in greater detail below), incoherent-to-coherent image conversion, image addition and subtraction, and frequency filters.

Finally, it should be mentioned that the methods proposed are basic processes which can be used as building blocks for advanced optical systems for information processing and optical computing. In addition, all the stated techniques can be applied to all compound semiconductors with the same crystal structure (43m), such as InP and CdTe.

B. MATRIX-VECTOR MULTIPLICATION

Figure 2:
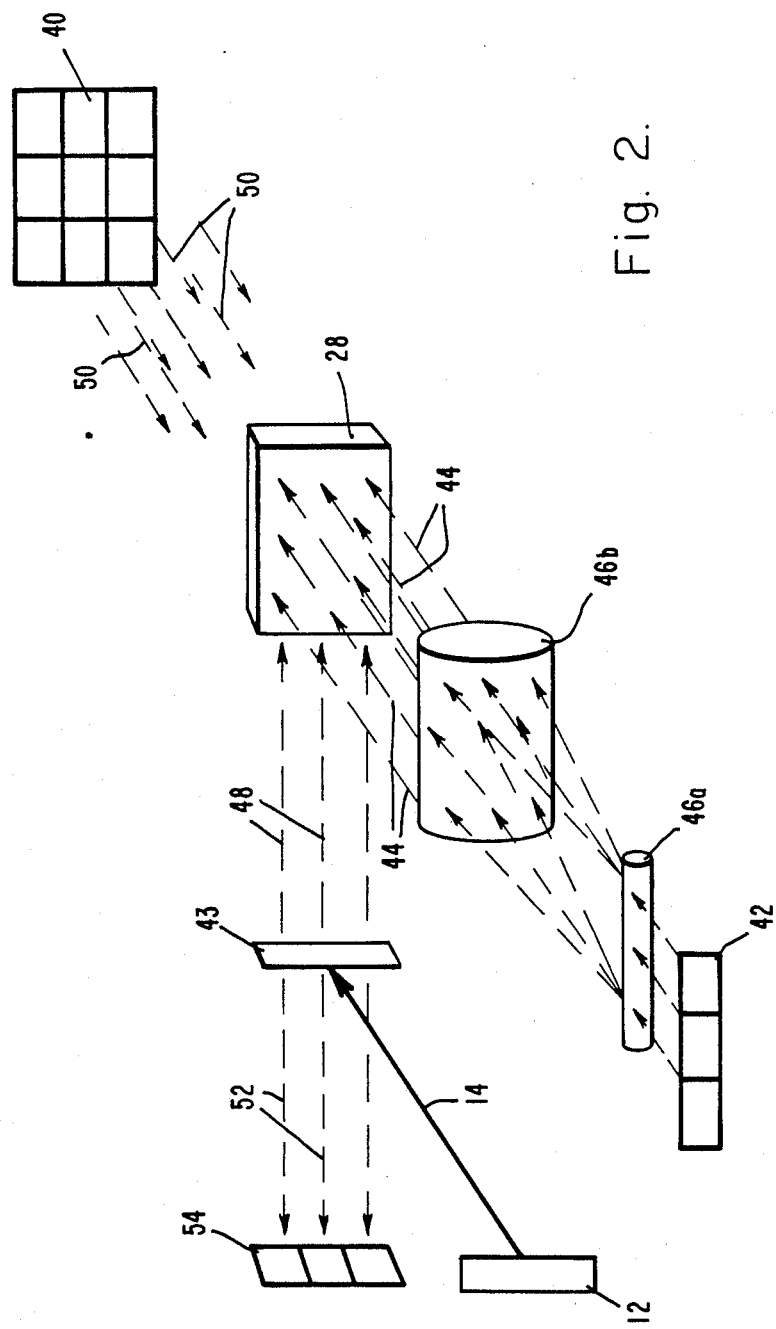
FIG. 2 is a schematic diagram illustrating the basic principal of optical matrix-vector multiplication using four-wave mixing in a thin photorefractive crystal.
Figure 3:
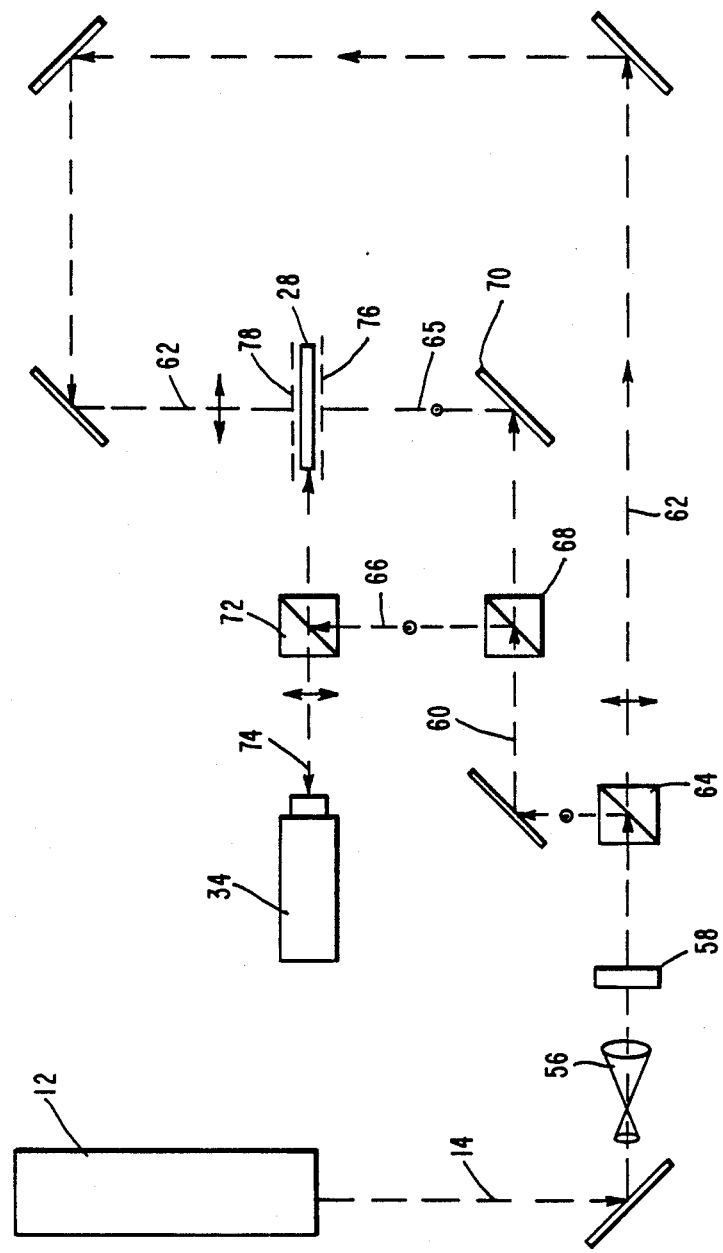
FIG. 3 is a schematic of the experimental setup used in optical matrix-vector multiplication.

FIG. 2 shows the proposed configuration for matrix-vector multiplication in which the summation is carried out in the crystal 28 during the four-wave mixing process. This takes place in a thin square wafer 28 of photorefractive GaAs. For simplification, a 3×3 matrix 40 and a 3-element vector 42 are considered, each illuminated by a light source (not shown, but can be derived from source 12 by mirrors, as seen in FIG. 3).

The vector 42 is arranged in a row form and each element is fanned out into a column beam 44 of uniform intensity by a set of cylindrical lenses 46a, 46b. The three column beams 44 are incident perpendicularly onto the wafer. A rectangular-shape, plane-wave beam 48, obtained from light source 12 and with the width of the beam equal to the wafer thickness, is directed perpendicularly on the left side surface of the crystal 28 by a polarizing beam splitter 43. The beam travels along length of the crystal 28 and intercepts the beam 44 representing the vector 42.

Since the two beams 44, 48 are coherent, index gratings of strength proportional to the intensity of the corresponding vector element are formed. A third beam 50 bearing the information of the matrix 40 is incident perpendicularly onto the wafer 28 through the opposite surface from the vector beam 44 (see also FIG. 3) and is diffracted by the grating. The intensity of the diffracted beam 52 corresponding to each element of the matrix is proportional to the intensity product of the corresponding vector and matrix elements, which can be written as M(i,j)a(j), within a proportional factor, where a(j) is the j-th element of the vector and M(i,j) is the i-th matrix element at the j-th row.

The diffracted beams 52 travel from right to left along the wafer length. All the diffracted beams from the elements in one row of the matrix coincide spatially and the summation is done automatically. If the diffraction efficiency is small and the absorption of the material is neglectable, the output from one row is equal to the sum of diffracted beams from all the volume elements in the row, namely b(i)=ΣM(i,j)a(j).

The total output 54 is the resultant vector of the matrix-vector multiplication and is arranged in a column form as shown in FIG. 2.

It should be noted that the roles of the matrix 40 and vector 52 in the configuration are interchangeable, namely, the matrix beam 50 can be a write beam and the vector beam 44 can be the read beam. The result is the same.

FIG. 3 shows a sketch of the experimental setup. A YAG laser 12 operating in CW mode at wavelength of 1.06 μm was used. A thin GaAs crystal 28 of dimensions nominally 5 mm × 8 mm × 0.5 mm was cleaved from a double-side polished, (100)-oriented liquid-encapsulated Czochralski-(LEC)-grown, undoped, semi-insulating wafer. The cleaved surfaces had (011) orientations.

After a beam expander 56 and a half-wave plate 58, the laser beam is split into two beams 60, 62 by polarizing beam splitter 64. The polarization of one beam (60) is perpendicular to the plane of the drawing (i.e. s-polarization) and that of the other (62) is in the plane of the drawing (i.e. p-polarization). The intensity ratio of the two beams 60, 62 can be set by rotating the half-wave plate 58. The s-polarized beam 60 is further divided into two equal intensity beams, 65 and 66, by a beam splitter 68. After being reflected at a mirror 70, one of the beams (65) carrying the information of the vector is incident perpendicular on the front (001) surface of the crystal 28. After being reflected at a polarizing beam splitter 72, the other beam 66 enters the crystal 28 through a (110) cleaved surface.

The two beams 65 and 66 intercept each other and create the index grating in the crystal 28. The p-polarized beam 62 with the matrix information enters into the crystal 28 through the opposite direction of beam 65 and reads the volume hologram 28a. As a result, a diffracted beam 74 is formed and travels in the opposite direction of beam 66 to the camera 34 through the polarizing beam splitter 72.

The cleaving of a GaAs wafer is the simplest way to obtain thin crystals with optical flat side surfaces. The crystal orientation obtained is suitable for the regular four-wave mixing in which the polarization of the diffracted beam 74 is the same as that of the read beam 62. In order to eliminate the background light due to scattering of the write beams, the read beam 62 may be chosen to be p-polarized.

For example, the following matrix and vector were chosen:

$$M = \begin{bmatrix} 1 & 0 & 1 & 1 \\ 0 & 1 & 0 & 1 \\ 1 & 0 & 0 & 0 \\ 0 & 1 & 0 & 1 \end{bmatrix} \quad a = \begin{bmatrix} 1 \\ 0 \\ 1 \\ 0 \end{bmatrix}$$

The resultant vector b is:

$$b = \begin{bmatrix} 2 \\ 0 \\ 1 \\ 0 \end{bmatrix}$$

The matrix and vector information are encoded onto beam 65 and 62 by using transparencies 76, 78, in which transparent squares represent the 1's and the dark regions the 0's. Instead of using a set of cylindrical lenses to fan out the vector into the columns as described earlier, a transparency with transparent columns may be used. The transparencies 76, 78 were placed near the crystal 28 as shadow masks. The physical size of the matrix in the transparency is measured to be 2.5 × 2.5 mm². This is the active area used by the multiplication process.

As a result of the four-wave mixing, an output beam containing the product is generated. The image generated consists of two dots with an intensity ratio of two to one which corresponds well with the expected result. The matrix 80, expanded vector 82, and resultant vector 84 are shown in FIG. 5c, represented by a line drawing, where the stippled regions depict unexposed film.

The result demonstrates that a matrix-vector multiplication can be achieved using the proposed configuration as illustrated in FIG. 2. Because there are no spacings among the matrix and vector elements in the transparencies and the shadow masking approach is used, the spatial resolution of the experiment result is not ideal. However, this can be improved greatly by using transparencies of separate dots and lenses to image the transparencies onto the crystal. The purpose of this experiment is only to demonstrate the proposed concept of the multiplier using a thin photorefractive GaAs crystal.

Thus, a new configuration for matrix-vector multiplication using four-wave mixing in thin photorefractive crystal with the summation carried out in the crystal has been shown. A demonstration of the concept has been made using a thin GaAs crystal cleaved from a wafer commonly used for electronic applications. This can be applied to all III-V and II-VI compound semiconductors having the same 43m crystal structure as GaAs. The result indicates the potential for integrating optical processors together with electronic circuits and optoelectronic devices.

C. INTEGRATED SEMICONDUCTOR OPTICAL INFORMATION PROCESSORS

The demonstrations described in the previous sections have established the feasibility of using photorefractive semiconducting crystals, such as GaAs, InP, and CdTe, as optical processing media for image processing and optical computing applications. The results provide a unique opportunity to integrate photorefractive optical processors with optoelectronic devices, such as electrically addressable spatial light modulators. This could lead to the development of a new information processing technology which consolidates all the advantages of optics and electronics.

As indicated above, matrix-vector multiplication has been shown using a degenerate four-wave mixing configuration in a thin crystal chip cleaved from a 3 inch diameter GaAs wafer, commonly used for fabricating optoelectronic and electronic devices on it.

Figure 4A:
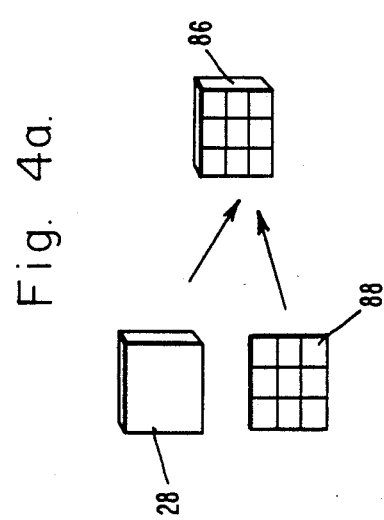
FIG. 4a illustrates the integration of a spatial light modulator and a processor.
Figure 4B:
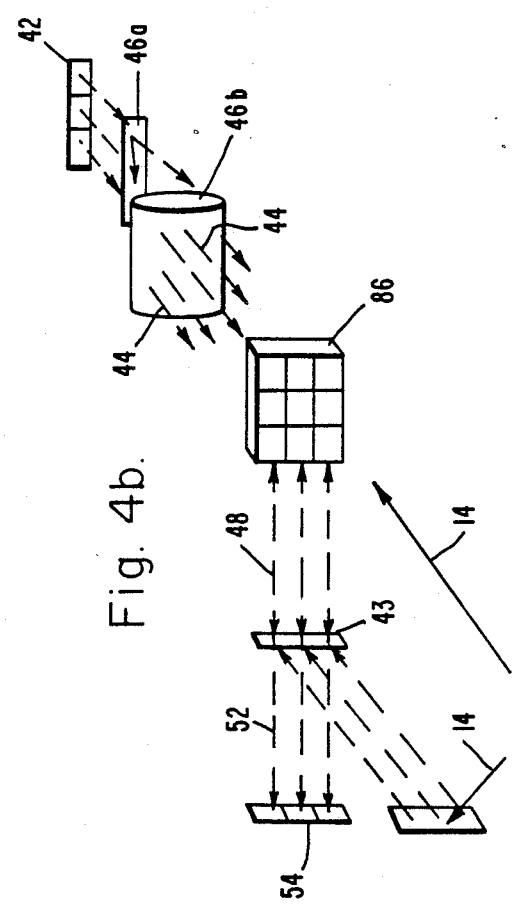

One can fabricate an integrated device 86 for the operation by forming an electrically addressable spatial light modulator (SLM) 88 on the surface of the photorefractive semiconducting crystal 28 for matrix input (see FIG. 4a) and using the bulk as the processing medium for the multiplication (see FIG. 4b). With a laser providing coherent beams to write the index grating, beam collimating lenses, beam splitters, and mirrors, an integrated hybrid matrix-vector multiplier is formed. This is the first step toward the integration of optical processors and optoelectronic devices.

The monolithic part of this integrated device 86 (i.e. the crystal 28 plus SLM 88), shown in FIG. 4a, is a useful and versatile element for all versions of matrix-vector multiplication. It can be used to generate not only matrix-vector inner and outer products, but also vector-vector inner and outer products, depending on the configuration employed. Therefore, it can be an important building block for optical interconnects and neural networks.

The photorefractive processor is an all-optical processor. Therefore, the input and control signals have to be in the form of spatially modulated beams, which can be generated by other optical processors or an electrically addressed SLM converting electrical data to optical. In order to use the advantage of fast speed available from semiconductor processors, it requires SLMs operating at a frame rate of 1000 Hz or higher and at the wavelength compatible to lasers used for the photorefractive effect. There are several types of SLMs currently under research and development which can fulfill the need. In order to integrate with optical processors, semiconductor SLMs on semiconductors are the logical choice. Currently, (Ga,In)-As/GaAs, (Ga,In)As/InP, and (Hg,Cd)Te/CdTe superlattice SLMs are potential candidates for the integration.

In order to explore the full integration of optical processors with optoelectronic devices, the feasibility of creating integratable optical components must be addressed. The simple-minded approach is to miniaturize the traditional components. However, the advance in computer-generated holographic patterns and electron beam lithography create promising ways to make holographic patterns at solid surfaces and interfaces which can not only provide functions of almost all conventional optical components, but also create novel applications.

The conceived integration is a three-dimensional integration of optical, optoelectronic, and electronic device, which consolidates all benefits available from electronics and optics as well as passive optical components using holographic patterns. This integration can lead to the miniaturization of optical information processing systems.

INDUSTRIAL APPLICABILITY

The teachings of the invention are expected to find use in the next generation of optical processing systems, comprising integrated optoelectronics. Such integration of photorefractive optical processors with optoelectronic devices to generate information processing applications can lead to the development of a new information processing technology which consolidates all the advantages of optics and electronics.

Thus, optical processing in compound semiconductors has been disclosed. It will be appreciated by those skilled in the art that various changes and modifications of an obvious nature may be made without departing from the spirit and scope of the invention, and all such changes and modifications are considered to fall within the scope of the invention, as defined by the appended claims.

What is claimed is:

1. An optical processor including a semi-insulating single crystal of a III-V material and having a 43m crystal symmetry, said single crystal cleaved to form a slab having a front surface and a rear surface separated by side surfaces and oriented such that two input writing beams of electromagnetic radiation generated by one coherent source, incident on opposite surfaces and at least one of which writing beams is encoded with information, and a reading beam of electromagnetic radiation generated by said coherent source, incident on either the same surface as one of said writing beams or on a surface perpendicular thereto, interact within said crystal to produce an output beam of electromagnetic radiation, said output beam having modified information encoded thereon.

2. The optical processor of claim 1 wherein said slab comprises a material selected from the group consisting of GaAs and InP.

3. The optical processor of claim 1 wherein said writing beams have polarization along the direction and illuminate said single crystal from opposite sides in such a way that a space charge field and a grating effect induced via a photorefractive effect of said crystal are perpendicular to said surface, along the direction.

4. The optical processor of claim 3 wherein one of said writing beams is incident on said front surface and the other of said writing beams is incident on said rear surface and said reading beam is incident on said front surface, with all three of said beams having the same polarization, and with said output beam emanating from said front surface, having a polarization perpendicular to that of said three beams.

5. The optical processor of claim 4 further including a transparency encoded with information placed in one of said writing beams a given distance from said single crystal to provide imaging by phase conjugation.

6. The optical processor of claim 5 further including a lens placed between said source and said transparency, with the Fourier plane of said lens coinciding with said single crystal to provide edge enhancement.

7. The optical processor of claim 6 further including two different transparencies and two lenses arranged so that said crystal is illuminated with the Fourier transform of said transparencies, with said output beam Fourier transformed to obtain an output image which is a convolution of said transparencies.

8. The optical processor of claim 7 wherein one of said transparencies is reflected around its center to produce an output image which is correlated to said transparencies.

9. The optical processor of claim 3 wherein said single crystal comprises a thin square wafer with a thickness similar to that of semiconductor chips used to fabricate optoelectronic and electronic integrated circuits.

10. The optical processor of claim 9 wherein a matrix image and a vector image are separately illuminated by a source of electromagnetic radiation to produce beams carrying said images, each beam incident on an opposite surface of said single crystal, and wherein a plane wave beam having a width equal to the thickness of said single crystal is incident on an edge surface, said vector beam and said plane wave beam interacting to produce index gratings of strength proportional to the intensity of said vector image, said matrix beam being diffracted by said grating, the intensity of said diffracted beam corresponding to each element of said matrix being proportional to the intensity product of the corresponding vector and matrix elements, thereby forming a resultant vector of matrix-vector multiplication.

11. The optical processor of claim 3 wherein said slab comprises said single crystal and an electrically addressable spatial light modulator to form an integrated matrix-vector multiplication processor capable of inputting matrix information from an electronic system.

12. In combination, an optical processor integrated with an optoelectronic device, said optical processor including a semi-insulating single crystal of a III-V material and having a 43m crystal symmetry, said single crystal cleaved to form a slab having a front surface and a rear surface separated by side surfaces and oriented such that two input writing beams of electromagnetic radiation generated by one coherent source, incident on opposite surfaces and at least one of which writing beams is encoded with information, and a reading beam of electromagnetic radiation generated by said coherent source, incident on either the same surface as one of said writing beams or on a surface perpendicular thereto, interact within said crystal to produce an output beam of electromagnetic radiation, said output beam having modified information encoded thereon.

13. The combination of claim 12 wherein said slab comprises a material selected from the group consisting of GaAs and InP.

14. The combination of claim 12 wherein said writing beams have polarization along the or direction and illuminate said single crystal from opposite sides in such a way that a space charge field and a grating effect induced via a photorefractive effect of said crystal are perpendicular to said surface, along the direction.

15. The combination of claim 14 wherein one of said writing beams is incident on said front surface and the other of said writing beams is incident on said rear surface and said reading beam is incident on said front surface, with all three of said beams having the same polarization, and with said output beam emanating from said front surface, having a polarization perpendicular to that of said three beams.

16. The combination of claim 15 further including a transparency encoded with information placed in one of said writing beams a given distance from said single crystal to provide imaging by phase conjugation.

17. The combination of claim 16 further including a lens placed between said source and said transparency, with the Fourier plane of said lens coinciding with said single crystal to provide edge enhancement.

18. The combination of claim 17 further including two different transparencies and two lenses arranged so that said crystal is illuminated with the Fourier transform of said transparencies, with said output beam Fourier transformed to obtain an output image which is a convolution of said transparencies.

19. The combination of claim 18 wherein one of said transparencies is reflected around its center to produce an output image which is correlated to said transparencies.

20. The combination of claim 14 wherein said single crystal comprises a thin square wafer with a thickness similar to that of semiconductor chips used to fabricate optoelectronic and electronic integrated circuits.

21. The combination of claim 20 wherein a matrix image and a vector image are separately illuminated by a source of electromagnetic radiation to produce beams carrying said images, each beam incident on an opposite surface of said single crystal, and wherein a plane wave beam having a width equal to the thickness of said single crystal is incident on an edge surface, said vector beam and said plane wave beam interacting to produce index gratings of strength proportional to the intensity of said vector image, said matrix beam being diffracted by said grating, the intensity of said diffracted beam corresponding to each element of said matrix being proportional to the intensity product of the corresponding vector and matrix elements, thereby forming a resultant vector of matrix-vector multiplication.

22. The combination of claim 14 wherein said slab comprises said single crystal and an electrically addressable spatial light modulator to form an integrated matrix-vector multiplication processor capable of inputting matrix information from an electronic system.

23. The combination of claim 12 wherein said optoelectronic device comprises an electrically addressable spatial light modulator.

24. An optical processor including a semi-insulating single crystal of a II-VI material and having a 43m crystal symmetry, said single crystal cleaved to form a slab having a front surface and a rear surface separated by side surfaces and oriented such that two input writing beams of electromagnetic radiation generated by one coherent source, incident on opposite surfaces and at least one of which writing beams is encoded with information, and a reading beam of electromagnetic radiation generated by said coherent source, incident on either the same surface as one of said writing beams or on a surface perpendicular thereto, interact within said crystal to produce an output beam of electromagnetic radiation, said output beam having modified information encoded thereon, said writing beams having polarization along the direction and illuminating said single crystal from opposite sides in such a way that a space charge field and a grating effect induced via a photorefractive effect of said crystal are perpendicular to said surface, along the direction.

25. The optical processor of claim 24 wherein said slab comprises CdTe.

26. The optical processor of claim 24 wherein one of said writing beams is incident on said front surface and the other of said writing beams is incident on said rear surface and said reading beam is incident on said front surface, with all three of said beams having the same polarization, and with said output beam emanating from said front surface, having a polarization perpendicular to that of said three beams.

27. The optical processor of claim 26 further including a transparency encoded with information placed in one of said writing beams a given distance from said single crystal to provide imaging by phase conjugation.

28. The optical processor of claim 27 further including a lens placed between said source and said transparency, with the Fourier plane of said lens coinciding with said single crystal to provide edge enhancement.

29. The optical processor of claim 28 further including two different transparencies and two lenses arranged so that said single crystal is illuminated with the Fourier transform of said transparencies, with said output beam Fourier transformed to obtain an output image which is a convolution of said transparencies.

30. The optical processor of claim 29 wherein one of said transparencies is reflected around its center to produce an output image which is correlated to said transparencies.

31. The optical processor of claim 24 wherein said single crystal comprises a thin square wafer with a thickness similar to that of semiconductor chips used to fabricate optoelectronic and electronic integrated circuits.

32. The optical processor of claim 31 wherein a matrix image and a vector image are separately illuminated by a source of electromagnetic radiation to produce beams carrying said images, each beam incident on an opposite surface of said single crystal, and wherein a plane wave beam having a width equal to the thickness of said single crystal is incident on an edge surface, said vector beam and said plane wave beam interacting to produce index gratings of strength proportional to the intensity of said vector image, said matrix beam being diffracted by said grating, the intensity of said diffracted beam corresponding to each element of said matrix being proportional to the intensity product of the corresponding vector and matrix elements, thereby forming a resultant vector of matrix-vector multiplication.

33. The optical processor of claim 24 wherein said slab comprises said single crystal and an electrically addressable spatial light modulator to form an integrated matrix-vector multiplication processor capable of inputting matrix information from and electronic system.

34. In combination, an optical processor integrated with an optoelectronic device, said optical processor including a semi-insulating single crystal of a II-VI material and having a 43m crystal symmetry, said single crystal cleaved to form a slab having a front surface and a rear surface separated by side surfaces and oriented such that two input writing beams of electromagnetic radiation generated by one coherent source, incident on opposite surfaces and at least one of which writing beams is encoded with information, and a reading beam of electromagnetic radiation generated by said coherent source, incident on either the same surface as one of said writing beams or on a surface perpendicular thereto, interact within said crystal to produce an output beam of electromagnetic radiation, said output beam having modified information encoded thereon, said writing beams having polarization along the direction and illuminating said single crystal from opposite sides in such a way that a space charge field and a grating effect induced via a photorefractive effect of said crystal are perpendicular to said surface, along the direction.

35. The combination of claim 34 wherein said slab comprises CdTe.

36. The combination of claim 34, wherein one of said writing beams is incident on said front surface and the other of said writing beams is incident on said rear surface and said reading beam is incident on said front surface, with all three of said beams having the same polarization, and with said output beam emanating from said front surface, having a polarization perpendicular to that of said three beams.

37. The combination of claim 36 further including a transparency encoded with information placed in one of said writing beams a given distance from said single crystal to provide imaging by phase conjugation.

38. The combination of claim 37 further including a lens placed between said source and said transparency, with the Fourier plane of said lens coinciding with said single crystal to provide edge enhancement.

39. The combination of claim 38 further including two different transparencies and two lenses arranged so that said crystal is illuminated with the Fourier transform of said transparencies, with said output beam Fourier transformed to obtain an output image which is a convoluation of said transparencies.

40. The combination of claim 39 wherein one of said transparencies is reflected around its center to produce an output image which is correlated to said transparencies.

41. The combination of claim 34 wherein said single crystal comprises a thin square wafer with a thickness similar to that of semiconductor chips used to fabricate optoelectronic and electronic integrated circuits.

42. The combination of claim 41 wherein a matrix image and a vector image are separately illuminated by a source of electromagnetic radiation to produce beams carrying said images, each beam incident on an opposite surface of said single crystal, and wherein a plane wave beam having a width equal to the thickness of said single crystal is incident on an edge surface, said vector beam and said plane wave beam interacting to produce index gratings of strength proportional to the intensity of said vector image, said matrix beam diffracted by said grating, the intensity of said diffracted beam corresponding to each element of said matrix being proportional to the intensity product of the corresponding vector and matrix elements, thereby forming a resultant vector of matrix-vector multiplication.

43. The combination of claim 34 wherein said slab comprises said single crystal and an electrically addressable spatial light modulator to form an integrated matrix-vector multiplication processor capable of inputting matrix information from an electronic system.

44. The combination of claim 34 wherein said optoelectronic device comprises an electrically addressable spatial light modulator.

* * * * *